May 20, 1924.

C. C. LUTHER 1,494,854

COMBINED CUSHION SUPPORT AND TOOL BOX

Filed July 20, 1923

C. C. Luther, Inventor

By *William J. Jacobi*

Attorney

Patented May 20, 1924.

1,494,854

UNITED STATES PATENT OFFICE.

CLARENCE C. LUTHER, OF BARNHART, TEXAS.

COMBINED CUSHION SUPPORT AND TOOL BOX.

Application filed July 20, 1923. Serial No. 652,724.

*To all whom it may concern:*

Be it known that CLARENCE C. LUTHER, a citizen of the United States, residing at Barnhart, in the county of Irion and State of Texas, has invented certain new and useful Improvements in Combined Cushion Supports and Tool Boxes, of which the following is a specification.

This invention relates to a combined seat protector and tool box and has for its principal object to provide a simple device which is adapted to be supported upon the seat frame and the fuel tank of an automobile whereby the cushions will be supported thereon and the springs in the cushions will be prevented from bending or otherwise causing the cushions to sag.

Another important object of the invention is to provide a cushion protector and a tool box which is of such construction as to enable the same to be properly disposed under the front seat and more particularly is adapted for use in connection with the Ford type of automobiles.

A still further object of the invention is to provide a cushion protector and a tool box which is of such a construction as to provide means whereby tools or the like may be carried under the front seat in addition to the tool box usually provided under the back seat of the Ford type of automobiles, and furthermore is of such a construction as to permit a person to have access to the fuel tank without the necessity of having to remove the device from its supported position.

Another important object of the invention is to provide a cushion protector and a tool box of the above mentioned character which is simple in construction, inexpensive, strong and durable and well adapted for the purpose for which it is designated.

Other objects and advantages of this invention will become apparent during the course of the following description.

Figure 1:
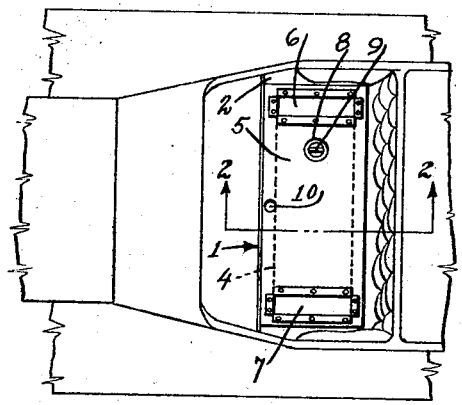
Figure 2:
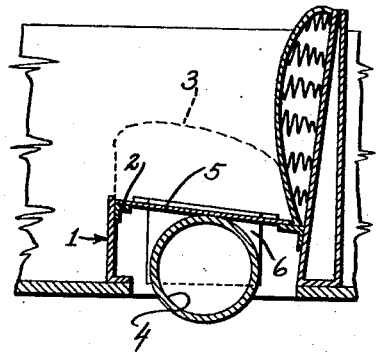
Figure 3:
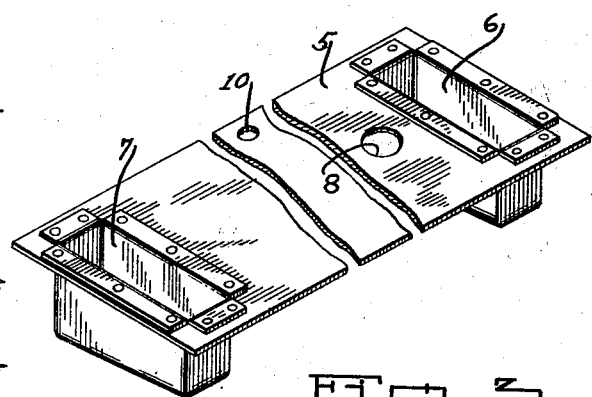

In the accompanying drawings forming a part of the specification, and in which like numerals designate like parts throughout the same, Figure 1 is a plan view showing the seat structure with the cushion removed and my invention in position thereon, Figure 2 is a sectional view taken on line 2—2 of Fig. 1, and Figure 3 is a perspective view of the cushion seat protector.

In the drawings wherein for the purpose of illustration is shown the preferred embodiment of my invention, the numeral 1 designates generally a front seat structure as used on the Ford type of automobiles and is provided with the upper marginal flange 2 which is usually adapted to support the seat cushion 3. The numeral 4 designates the fuel tank which is disposed within the front seat structure 1 directly beneath the cushion 3.

Heretofore the seat cushion 3 was supported only upon the marginal flange 2 and its central portion was adapted to come in contact with the top of the fuel tank 4, and this causes the springs of the seat cushion to bend and thereby result in the sagging of the cushion, and consequently added to the discomfort of the occupant of the seat. To remedy these disadvantages and to insure the proper supporting of the cushion seat in position on the marginal flange 2, I have provided a cushion protector and support as well as in combination with a pair of receptacles which are adapted to serve as tool kits or the like as will be hereinafter more fully described.

My cushion seat protector comprises a substantially rectangular plate formed of suitable metallic material and designated by the numeral 5 and is provided with cut out portions formed transversely adjacent each end thereof and in which are adapted to be secured a receptacle 6 and 7 respectively.

The plate 5 is adapted to rest on the marginal flange 2 and in such a manner as to permit the receptacles 6 and 7 carried thereby to extend downwardly between the ends of the fuel tank 5 and the end walls of the front seat structure 1 in the manner more clearly shown in Fig. 1 of the drawings. The plate 5 is furthermore provided with an enlarged opening 8 which is for the purpose of permitting access to the removable closure 9 provided on the fuel tank whereby access thereto may be had when it is desired to fill the tank with gasoline or the like. When in position on the marginal flange 2 of the seat structure 1, the plate 5 will support the seat cushion 3 over its entire bottom surface and will thereby prevent the sagging of the cushion in its central portion as heretofore, and at the same time will prevent the springs in the cushion from bending due to the contact with the top of the fuel tank 4. A suitable opening 10 is also provided in the central portion of the plate 5 adjacent one of the side edges thereof for the purpose of permitting the seat to be readily disengaged from the marginal flange 2 whenever it is desired to remove the plate and the tool boxes carried thereby from its supported position.

The receptacles 6 and 7 are also formed of the same material as the plate 5 and are secured at their upper ends in any suitable manner to the plate 5, such as by providing flanges at the upper portions of the receptacle which are adapted to be secured to the top faces of the plate or in any other suitable manner, however, I do not wish to limit myself to the particular manner in which the receptacles are associated with and carried by the plate 5.

As will be noted from Fig. 3 of the drawings, the receptacles 6 and 7 are so formed as to have their upper longitudinal portions tapering rearwardly so as to cause the plate 5 to slant at a proper degree in order to accommodate its arrangement with respect to the marginal flanges 2 formed on the seat structure 1 and support the cushion 3 in the usual manner. As it is customary to have the front seat of a vehicle slightly tilted, the construction of the receptacles are such as to enable the plate 5 to maintain the relative slant caused by the arrangement of the seat supporting flanges.

When the plate is in position on the marginal flanges 2, and the receptacles 6 and 7 are disposed between the ends of the fuel tank 4 and the ends of the seat structure 1, the receptacles are adapted to receive various articles or tools which are useful upon a machine, and furthermore may be used for any other necessary purposes. Furthermore it is not necessary to remove the plate and the receptacles associated therewith when it is desired to refill the fuel tank for the reason that the enlarged opening enables the person to readily remove the cap 9 from the fuel tank whereby gasoline may be dispensed into the fuel tank without any difficulty.

The simplicity of my device enables the same to be easily and quickly placed in position upon a seat structure, and furthermore does not require the use of a complicated number of tools in order to hold the same in proper position, and will at all times insure the comfort of the driver and prevent sagging of the cushion seat as heretofore, and also provide additional receptacles for holding tools or the like.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

I claim—

1. A device of the class described comprising a plate substantially rectangular in design, said plate adapted to rest on the marginal flanges provided on the seat structure of an automobile, said plate being provided with receptacles adapted to be disposed between the ends of the fuel tank and mounted in said seat structure, and the ends of the latter.

2. A device of the class described comprising a plate substantially rectangular in design, said plate adapted to rest on the marginal flanges of the seat frame of an automobile, said plate provided with transverse cut out portions adjacent the ends thereof, receptacles having their upper edges receivable in said cut out portions and secured to the top face of said plate, said receptacles adapted to fit against the ends of a fuel tank mounted in said seat structure, and said plate being adapted to support a seat cushion thereon.

3. A device of the class described comprising a plate substantially rectangular in design, said plate adapted to rest on the marginal flanges of a seat frame of a vehicle, receptacles depending from said plate adjacent the ends thereof and adapted to fit against the ends of a fuel tank mounted in said seat frame, and said plate being provided with an opening located directly over the filler cap provided on said fuel tank.

In testimony whereof I affix my signature.

CLARENCE C. LUTHER.